(12) United States Patent
Barzilai et al.

(10) Patent No.: US 7,225,460 B2
(45) Date of Patent: May 29, 2007

(54) ENTERPRISE PRIVACY MANAGER

(75) Inventors: Zeev Barzilai, Tel Aviv (IL); Sergei Shmulyian, Giyateim (IL); Stuart Feldman, Stanford, CT (US)

(73) Assignee: International Business Machine Corporation, Armonk, NY (US)

( * ) Notice: Subject to any disclaimer, the term of this patent is extended or adjusted under 35 U.S.C. 154(b) by 738 days.

(21) Appl. No.: 09/728,661

(22) Filed: Dec. 1, 2000

(65) Prior Publication Data
US 2002/0104015 A1 Aug. 1, 2002

Related U.S. Application Data

(60) Provisional application No. 60/202,796, filed on May 9, 2000.

(51) Int. Cl.
*G06Q 20/00* (2006.01)
(52) U.S. Cl. .......................................... 726/1; 709/217
(58) Field of Classification Search .................... 707/2; 709/9, 202, 217, 223, 228, 230, 203, 227; 713/201, 202, 152, 153; 726/6, 26
See application file for complete search history.

(56) References Cited

U.S. PATENT DOCUMENTS 6,308,203 B1 * 10/2001 Itabashi et al. ............. 709/217
6,496,855 B1 * 12/2002 Hunt et al. .................. 709/217
6,560,639 B1 * 5/2003 Dan et al. ................... 709/218
6,581,059 B1 * 6/2003 Barrett et al. ................ 707/9

OTHER PUBLICATIONS http://www.research.att.com/projects/p3p.
www.w3.org/p3p.
www.tivoli.com/products/index/secureway_privacy_mgr/index.html.
www.apache.org.
New U.S. Appl. No. 09/731,388, filed Nov. 30, 2000, entitled "Business Privacy in the Electronic Marketplace".

* cited by examiner

*Primary Examiner*—Kambiz Zand
*Assistant Examiner*—Ellen C. Tran
(74) *Attorney, Agent, or Firm*—Darby & Darby

(57) ABSTRACT

A method for privacy management includes providing a linked collection of interactive resources through which a user is able to exchange information with an enterprise that provides the resources, and assigning respective, non-uniform privacy policies to at least some of the resources regarding use of the information that is exchanged through the resources. The user, accessing a given one of the resources, is provided with the respective privacy policy for that resource. At least a portion of the information that is associated with the given one of the resources is exchanged with the user subject to the provided privacy policy.

47 Claims, 7 Drawing Sheets

ENTERPRISE PRIVACY MANAGER

CROSS-REFERENCE TO RELATED APPLICATIONS

This application claims the benefit of U.S. Provisional Patent Application No. 60/202,796, filed May 9, 2000, which is incorporated herein by reference.

FIELD OF THE INVENTION

The present invention relates generally to data privacy, and specifically to developing, maintaining and applying privacy policies with respect to information collected from users by network servers.

BACKGROUND OF THE INVENTION

Data privacy is a problem of growing concern in exchanges of information over the World Wide Web, and particularly in electronic commerce (e-commerce) conducted over the Web. Enterprise Web sites prompt users to input various items of personal information as a prerequisite to providing information or supplying goods to the users. Needless to say, uncontrolled use of this information can subject the user to unwanted consequences, ranging from nuisance e-mail to fraud.

In response to the need to protect private information, Web sites have begun to establish and post their own privacy policies. Visitors to such sites are invited to check the privacy policies upon entering the site, in order to know in advance how the private information that they disclose will be treated. To facilitate this process, the World Wide Web Consortium has undertaken the Platform for Privacy Preferences Project (P3P), which is described at www.w3.org/P3P. P3P is envisioned as an industry standard for providing a simple, automated way for users to gain more control over the use of personal information on Web sites they visit. It provides a standardized set of multiple-choice questions, covering major aspects of a Web site's privacy policies, in order to give a "snapshot" of how a site handles personal information about its users. P3P-enabled Web sites make this information available in a standard, machine-readable format using Extensible Markup Language (XML) and the Hypertext Transfer Protocol (HTTP). P3P-enabled browsers can read the policy snapshot automatically and compare it to the consumer's own set of privacy preferences. If there is a mismatch between the site's privacy policy and the user's preferences, the user then has the option of not conducting further business with the site.

While P3P specifies a convenient way for Web site operators to inform visitors of their privacy policies, it is not meant to address the questions of how such policies are to be managed and enforced within the enterprise that operates the Web site. Existing tools for privacy policy management provide only rudimentary functionality. The most advanced tool for this purpose of which the inventors are aware is the Tivoli® SecureWay® Privacy Manager, which is described at www.tivoli.com/products/index/secureway_privacy_mgr/index.html. The SecureWay Privacy Manager is an extension to the access control capabilities of the Tivoli SecureWay Policy Director for electronic business (e-business), which is offered by IBM Corporation (Armonk, N.Y.). The SecureWay Privacy Manager provides the following capabilities:

It centralizes administration of enterprise privacy policies to help enforce access to personal data.

It defines and allows modification of privacy roles and categories of data for e-commerce, for use in implementing and administering access controls.

It supports "dynamic roles," enabling access decisions to be made based on the relationship between the person requesting the data and the type or subject of the data.

It uses authorization services provided by the SecureWay Policy Director to keep access control consistent across the entire enterprise.

Neither Tivoli nor any other privacy management tool known in the art, however, offers a structured solution to managing variations in privacy policy that may be implemented in different parts of a single enterprise or changes in privacy policy that may occur over time.

SUMMARY OF THE INVENTION

In preferred embodiments of the present invention, an enterprise privacy manager (EPM) provides comprehensive support for setting and enforcing variable privacy policies across an entire enterprise. The EPM receives and stores privacy policies with regard to each of a plurality of nodes in an information exchange structure maintained by the enterprise. In terms of current paradigms for e-business over the World Wide Web, each such node represents a Web page or group of Web pages, within a Web site or group of sites maintained by the enterprise, through which users are asked to submit private information to the enterprise. The policies may vary from node to node, and may be altered over time.

The EPM ensures that the users receive notice of the policy in effect at the specific node that they are currently visiting, and that the users consent to the appropriate policy before submitting private information. When a change in the node privacy policy has occurred since the user's previous visit to the node (if there was such a visit), the EPM informs the user of the change, and prompts the user for consent to the change before allowing the interaction to continue. When an application attempts to access the private information that users have submitted, whether the application has originated within the enterprise or is run by an external entity (such as a partner enterprise with data sharing privileges), the EPM intercepts the access request. For each item of user information requested by the application, the EPM checks for compliance of the application with the privacy policies subject to which the users submitted the information. Access is granted, preferably on a per-user, per-item basis, only after compliance has been verified.

In some preferred embodiments of the present invention, the information exchange nodes are arranged in a hierarchical structure. Preferably, this structure corresponds to a linked structure of Web pages within the enterprise Web site. A basic privacy policy is defined for a root node in the structure, typically the enterprise home page. Preferably, this basic policy applies to all of the nodes in the structure. Additional privacy rules are defined for other nodes in the hierarchy. The privacy policy for any given node is determined by combining the privacy policy of its parent node with the additional privacy rules defined for the node itself. Thus, the level of privacy provided for user information typically increases as the user progresses deeper into the hierarchy and is asked to submit additional personal information or to authorized additional uses of information already submitted. This pattern of graduated privacy is useful particularly in e-commerce applications, wherein a user must generally submit only limited, non-sensitive private information to browse a Web site, but is then prompted for increasingly sensitive information when he or she submits a product inquiry to the site and subsequently places an order. The hierarchical organization simplifies maintenance of the privacy policies by the EPM, as well as facilitating user interaction in connection with policy notice and consent.

A further aspect of the present invention is in affording the enterprise greater flexibility in presenting its privacy policy to users and in adapting the policy to different types of users and their needs. In one preferred embodiment of the present invention, a system of ratings is provided, giving a summary privacy grade to the privacy policy of a Web site or page based on the collection of rules that make up the policy. The EPM can use the ratings to parse policy files and grade the policy of a site or page. Alternatively or additionally, the EPM can be programmed to automatically generate detailed privacy policies meeting a specified grade. The summary grades also provide users with a quick and simple evaluation of the privacy policy of a site or page that they are visiting. In another preferred embodiment of the present invention, different classes of privacy service are defined, so that the EPM gives certain preferred users enhanced privacy treatment.

In some preferred embodiments of the present invention, the EPM maintains a log of all personal information that is submitted by users and disclosed to applications. The log indicates the privacy policies in effect with respect to each such information exchange. The log also records application requests to access the information and the EPM's grant or refusal of access in each case. The log can be audited using standard or custom audit tools in order to verify adherence of the enterprise to its declared privacy policies.

Preferably, the EPM maintains privacy policies in a standardized form, which is compatible with browsers used in visiting the enterprise Web site. P3P is a good example of such a standard form, which is appropriate for use in this context, but substantially any other machine-readable language for privacy policy representation may similarly be used. Furthermore, although preferred embodiments are described herein with reference to Web sites and user interactions with such sites, it will be understood that the principles of the present invention are applicable generally to structured exchanges of private information between users and an enterprise and are not limited to any specific framework of computer network communication.

There is therefore provided, in accordance with a preferred embodiment of the present invention, a method for privacy management, including:

providing a linked collection of interactive resources through which a user is able to exchange information with an enterprise that provides the resources;

is assigning respective, non-uniform privacy policies to at least some of the resources regarding use of the information that is exchanged through the resources;

providing to the user accessing a given one of the resources the respective privacy policy for that resource; and exchanging with the user at least a portion of the information that is associated with the given one of the resources, subject to the provided privacy policy.

Preferably, exchanging the information with the user includes receiving private information submitted to the enterprise by the user, wherein receiving the private information includes receiving the user's agreement to the privacy policy, and recording the private information together with an indication of the privacy policy agreed upon.

Alternatively or additionally, assigning the non-uniform privacy policies includes assigning a first privacy policy to a first one of the resources and a second, different privacy policy to a second one of the resources. Preferably, providing the linked collection of interactive resources includes arranging the resources in a hierarchy of nodes that includes a root node, such that each of the nodes except for the root node has a parent node in the hierarchy, and assigning the non-uniform privacy policies includes assigning to each of at least some of the nodes, including the nodes associated with the first and second resources, one or more respective privacy rules regarding use of the information that is associated with the node, and setting for each of the nodes a node privacy policy that includes the privacy rules assigned to the node combined, for each of the nodes except the root node, with the node privacy policy of its parent node. Further preferably, providing the privacy policy to the user includes informing the user who has exchanged the information associated with the first resource subject to the first privacy policy of a difference in the second privacy policy relative to the first privacy policy before exchanging the information associated with the second resource.

Preferably, assigning the non-uniform privacy policies includes assigning an initial privacy policy to one of the resources, and subsequently making a change in the initial privacy policy so as to assign a modified privacy policy to the resource, and providing the privacy policy to the user includes informing a user who has exchanged information with the resource subject to the initial privacy policy of the change. Most preferably, informing the user includes prompting the user to provide an input to indicate whether the user accepts or rejects the change.

In a preferred embodiment, assigning the privacy policies includes storing the privacy policies in a computer server belonging to the enterprise, and providing the privacy policy to the user includes intercepting a request by the user to access the given resource and providing the privacy policy for the resource responsive to the request. Preferably, the collection of resources includes a collection of Web pages accessible through a Web site of the enterprise, wherein providing the privacy policy includes conveying the policy in a standard form for presentation by a Web browser. Most preferably, the standard form includes a from specified by the Platform for Privacy Preferences Project (P3P).

In another Preferred embodiment, assigning the non-uniform privacy policies includes determining a rating for each of the policies based on a predetermined rating scale.

In yet another preferred embodiment, assigning the non-uniform privacy policies includes defining first and second user classes and defining, for a given one of the resources, different first and second privacy policies, respectively, for the first and second user classes, and providing the privacy policy to the user includes determining whether the user belongs to the first or second class, and providing the first or the second privacy policy accordingly.

There is also provided, in accordance with a preferred embodiment of the present invention, a method for privacy management, including:

arranging a body of information in a hierarchy of nodes that includes a root node, such that each of the nodes except for the root node has a parent node in the hierarchy;

assigning to each of at least some of the nodes one or more respective privacy rules regarding use of the information that is associated with the node;

setting for each of the nodes a node privacy policy that includes the privacy rules assigned to the node combined, for each of the nodes except the root node, with the node privacy policy of its parent node;

providing to a user who accesses a given one of the nodes the node privacy policy for that node; and exchanging with the user at least a portion of the information that is associated with the given one of the nodes, subject to the provided privacy policy.

Preferably, exchanging the information with the user includes receiving private information submitted by the user. Additionally or alternatively, arranging the body of information includes a associating the nodes with respective Web pages accessible through a Web site.

There is additionally provided, in accordance with a preferred embodiment of the present invention, a method for privacy management, including:

providing a linked collection of interactive resources through which a user is able to exchange information with an enterprise that provides the resources, at least some of the resources having privacy policies associated therewith regarding use of the information that is exchanged through the resources;

receiving information from users who access the resources subject to the privacy policies;

intercepting a request from an application to use the information received from the users;

querying the application to determine its compliance with the privacy policies subject to which the requested information was received; and providing the requested information subject to the compliance of he application with the privacy policies.

Preferably, the collection of interactive resources includes a collection of Web pages accessible through a Web site of the enterprise.

Further preferably, providing the linked collection of resources includes associating non-uniform privacy policies with the resources, and receiving the information includes receiving and storing different items of the information subject to different privacy rules from among the non-uniform privacy policies. Most preferably, providing the requested information includes checking the compliance of the application with the privacy rules respectively applicable to each of the items of the information requested by the application. Additionally or alternatively, providing the requested information includes determining that the application does not comply with the rules respectively applicable to a given one of the items, and refusing to provide the requested information with respect to the given item, while providing information regarding another of the items with respect to which the application does comply with the respectively applicable rules.

Further additionally or alternatively, receiving and storing the different items includes receiving the items from first and second ones of the users subject to respective first and second privacy policies, and providing the requested information includes checking the compliance of the application with both the first and the second privacy policies.

In a preferred embodiment, the method includes making a record of the request and of the information provided responsive thereto in a log for review in a subsequent privacy audit.

There is further provided, in accordance with a preferred embodiment of the present invention, apparatus for privacy management, including a computer enterprise server arranged to provide a linked collection of interactive resources through which a user is able to exchange information with an enterprise that provides the resources, wherein respective, non-uniform privacy policies are assigned to at least some of the resources regarding use of the information that is exchanged through the resources, and to provide to the user accessing a given one of the resources the respective privacy policy for that resource and to exchange with the user at least a portion of the information that is associated with the given one of the resources, subject to the provided privacy policy.

There is moreover provided, in accordance with a preferred embodiment of the present invention, apparatus for privacy management, including a computer server arranged to receive and store a body of information in a hierarchy of nodes that includes a root node, such that each of the nodes except for the root node has a parent node in the hierarchy, together with an assignment to each of at least some of the nodes of one or more respective privacy rules regarding use of the information that is associated with the node, and to determine for each of the nodes a node privacy policy that includes the privacy rules assigned to the node combined, for each of the nodes except the root node, with the node privacy policy of its parent node so as to provide to a user who accesses a given one of the nodes the node privacy policy for that node, and to exchange with the user at least a portion of the information that is associated with the given one of the nodes, subject to the provided privacy policy.

There is furthermore provided, in accordance with a preferred embodiment of the present invention, apparatus for privacy management, including a computer enterprise server arranged to provide a linked collection of interactive resources through which a user is able to exchange information with an enterprise that provides the resources, at least some of the resources having privacy policies associated therewith regarding use of the information that is exchanged through the resources, and to receive information from users who access the resources subject to the privacy policies, and to intercept a request from an application to use the information received from the users, to query the application to determine its compliance with the privacy policies subject to which the requested information was received, and to provide the requested information subject to the compliance of the application with the privacy policies.

There is also provided, in accordance with a preferred embodiment of the present invention, a computer software produce for privacy management, including a computer-readable medium in which program instructions are stored, which instructions, when read by a computer, cause the computer to provide a linked collection of interactive resources through which a user is able to exchange information with an enterprise that provides the resources, to assign respective, non-uniform privacy policies to at least some of the resources regarding use of the information that is exchanged through the resources, to provide to a user who accesses a given one of the resources the respective privacy policy for that resource, and to exchange with the user at least a portion of the information that is associated with the given one of the resources, subject to the provided privacy policy.

There is additionally provided, in accordance with a preferred embodiment of the present invention, a computer software product for privacy management, including a computer-readable medium in which program instructions are stored, which instructions, when read by a computer, cause the computer to arrange a body of information in a hierarchy of nodes that includes a root node, such that each of the nodes except for the root node has a parent node in the hierarchy, to assign to each of at least some of the nodes one or more respective privacy rules regarding use of the information that is associated with the node, to set for each of the nodes a node privacy policy that includes the privacy rules assigned to the node combined, for each of the nodes except the root node, with the node privacy policy of its parent node, to provide to a user who accesses a given one of the nodes the node privacy policy for that node, and to exchange with the user at least a portion of the information that is associated with the given one of the nodes, subject to the provided privacy policy.

There is still further provided, in accordance with a preferred embodiment of the present invention, a computer software product for privacy management, including a computer-readable medium in which program instructions are stored, which instructions, when read by a computer, cause the computer to provide a linked collection of interactive resources through which a user is able to exchange information with an enterprise that provides the resources, at least some of the resources having privacy policies associated therewith regarding use of the information that is exchanged through the resources, to receive information from users who access the resources subject to the privacy policies, to intercept a request from an application to use the information received from the users, to query the application to determine its compliance with the privacy policies subject to which the requested information was received, and to provide the requested information subject to the compliance of the application with the privacy policies.

The present invention will be more fully understood from the following detailed description of the preferred embodiments thereof, taken together with the drawings in which:

DETAILED DESCRIPTION OF PREFERRED EMBODIMENTS

Figure 1:
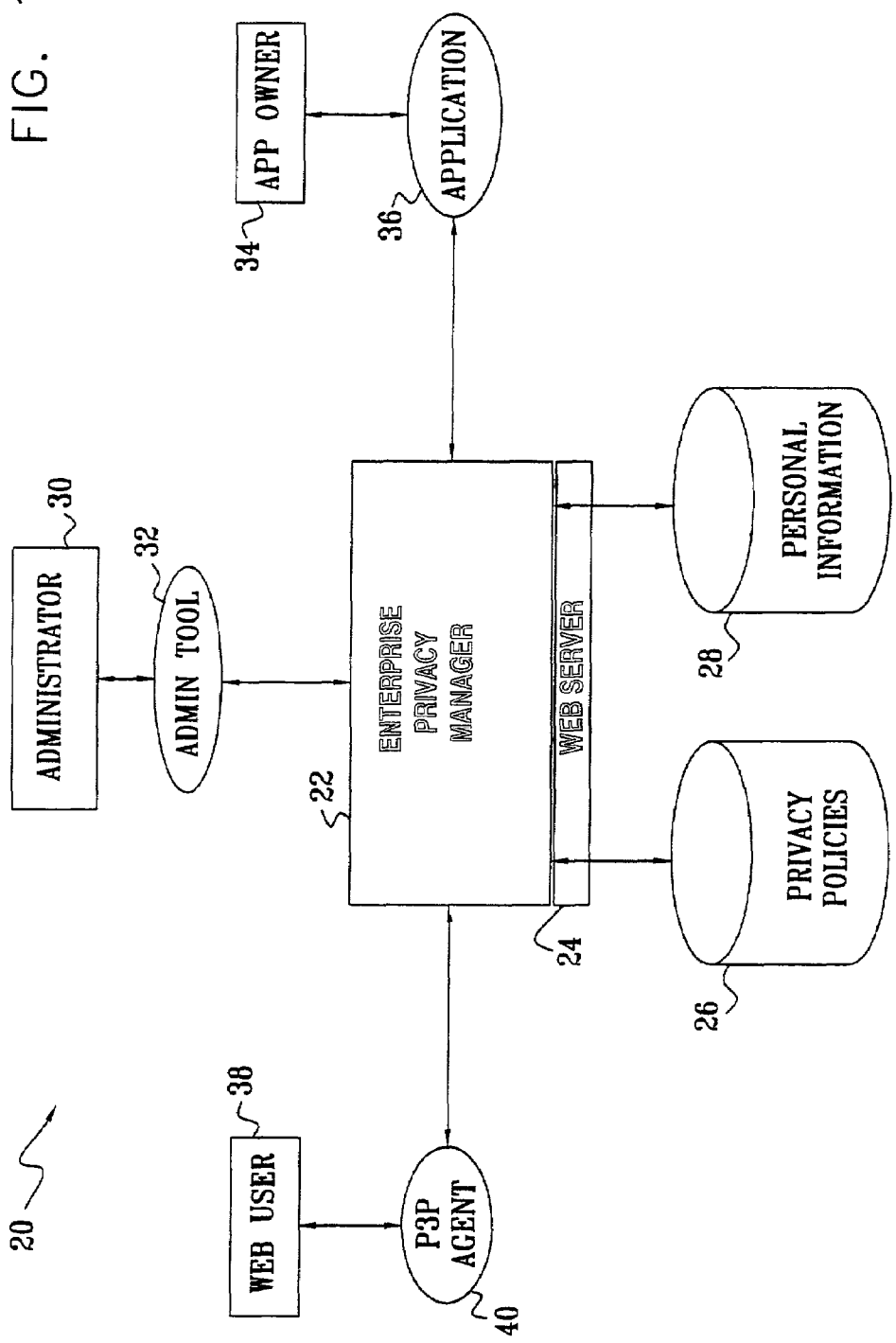
FIG. 1 is a block diagram that schematically illustrates a system for exchange and management of private information, in accordance with a preferred embodiment of the present invention.

FIG. 1 is a block diagram that schematically illustrates a system 20 for exchange and management of private information, in accordance with a preferred embodiment of the present invention. System 20 is built around an enterprise privacy manager (EPM) 22, which is responsible for managing privacy policies of the enterprise, collecting private information from users and managing access to the private information by internal and third-party applications. These functions are described in detail hereinbelow. EPM 22 is preferably embodied in a software application running on a suitable computer server, which is linked by a network to other computers within and outside the enterprise. The software for the EPM application may be conveyed to the server in electronic form or, alternatively, it may be supplied on tangible media, such as CD-ROM.

In the embodiment shown in FIG. 1 and described hereinbelow, EPM 22 runs as an application on a Web server 24, in conjunction with a Web site operated by the enterprise. Substantially any suitable Web server known in the art may be used for this purpose, such as the Apache server, distributed by the Apache Software Foundation (www.apache.org). The EPM uses a suitable relational database management system, as is known in the art, for the purposes of maintaining a policy repository 26 and a personal information database 28, as described below.

The EPM interfaces with a number of other entities in connection with its privacy management functions:

A site administrator 30 uses an administration tool 32 to post and update privacy policies. The privacy policies are held in policy repository 26 maintained by the EPM. Tool 32 preferably comprises an editor with a graphical user interface that enables the administrator to create, review and edit policies in a standard language, such as P3P.

A user 38 who accesses the Web site is served by a P3P agent 40, which serves as a proxy to retrieve privacy policies served by EPM 22 and to display the policies on the user's browser. Typically, the proxy runs on the user's computer or network server, in conjunction with the user's browser, as envisioned in the P3P standard. After accepting the privacy policy, the user submits personal information to the Web site and receives information, goods and services in return, subject to the privacy policies to which the user has agreed. The EPM stores the data that the user submits in personal information database 28.

An application owner 34, whether from inside or outside the enterprise, can access the information in database 28 using an application 36. EPM 22 intercepts and analyzes these application access requests, and provides information from database 28 only after ensuring that the application complies with the policies (in repository 26) covering the specific items of information that the application has requested.

Although EPM 22 is shown in FIG. 1 as having only three clients, exemplifying three types of interactions that the EPM handles, it will be understood that an actual EPM typically has many clients of each type, and may serve clients of other types, as well. There are generally multiple sub-types and different authorization levels within each of the overall client groups.

Figure 2:
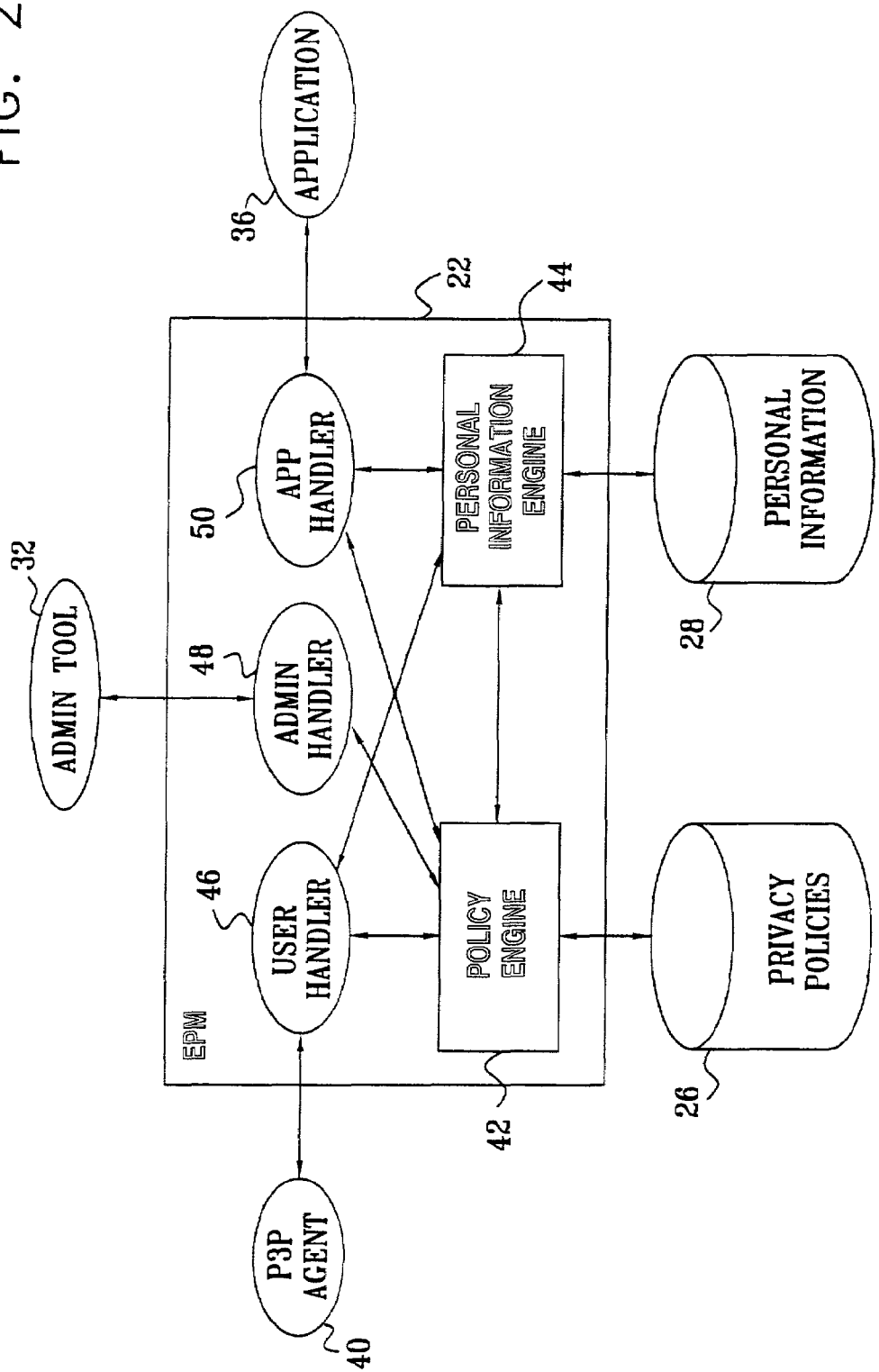
FIG. 2 is a block diagram that schematically shows details of an enterprise privacy manager used in the system of FIG. 1, in accordance with a preferred embodiment of The present invention.

FIG. 2 is a block diagram showing details of the internal structure of EPM 22, in accordance with a preferred embodiment of the present invention. The EPM has two core modules:

A policy engine 42, which maintains internal representations of the privacy policies in repository 26 that are pertinent to the different nodes in the enterprise Web site. The policy engine maintains a hierarchy of policies in the form of a tree, as described below, in which each node contains one or more time-dependent versions of the policy rules corresponding to that node. The node structure of the tree is stored in an XML meta-file, while the actual policy rules are stored in separated P3P/XML files. The files are parsed by engine 42 at startup of system 20 and are periodically saved to ensure server fault tolerance.

A personal information engine 44, which maintains database 28 and links the information in the database with policies in repository 26, and which manages access to database 28 by all other modules in system 20, including applications such as application 36. The information and policies are timestamped, as described below, in order to identify the policy version in effect at the time of submission by the user. There may thus be more than one policy link per user record in database 28. Engines 42 and 44 are preferably installed in a classpath directory of server 24, while repository 26 and database 28 are maintained in library directories of EPM 22 on the server.

In addition, EPM 22 comprises a number of interface modules for handling the different types of client interactions mentioned above:

A user request handler 46 manages privacy-related interactions with site users, such as supplying policy information retrieved by policy engine 42, and collecting data to be passed to personal information engine 44. Handler 46 preferably carries out these functions by interaction with P3P agent 40.

An administrator request handler 48 retrieves policies from policy engine 42 and enables the administrator, using tool 32, to add new policies and update existing policies maintained by the policy engine. Preferably, tool 32 comprises an application programming interface (API), which also enables the administrator to implement customized privacy management functions.

An application request handler 50 receives and processes information requests from application 36 and returns information that is provided by personal information engine 44, to the extent permitted by privacy policies. Preferably, application 36 is programmed by application owner 34 to interact with handler 50 using an API that is supplied for this purpose. The API enables the application owner to build privacy handling into the application in a straightforward way that is compatible with the interface provided by handler 50.

Interface modules 46, 48 and 50 are preferably implemented as Java servlets, which make library calls to engines 42 and 44. The servlets are preferably installed in a servlet directory of Web server 24.

Figure 3:
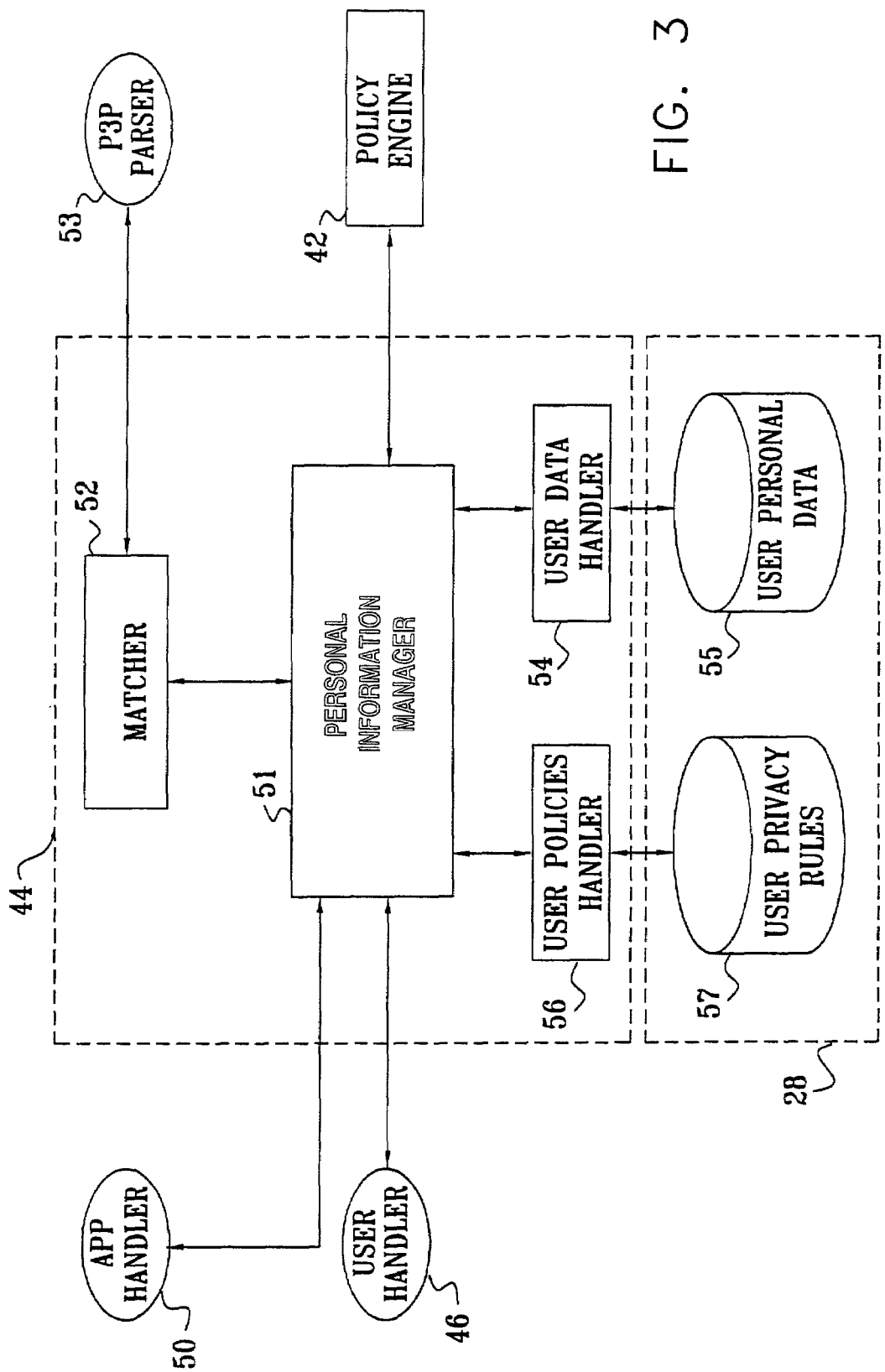
FIG. 3 is a block diagram that schematically shows details of a personal information engine used in the privacy manager of FIG. 2, in accordance with a preferred embodiment of the present invention.

FIG. 3 is a block diagram that schematically shows details of he functional structure of personal information engine 44, in accordance with a preferred embodiment of the present invention. A personal information manager 51 handles requests from application handler 50 and interactions with user handler 46. It also interacts with policy engine 42 for the purpose of retrieving policy information from repository 26 and providing information regarding the policies applicable to given users.

When an application requests user personal information from EPM 22, manager 51 invokes a matcher 52 to match the application privacy policy and list of data items against privacy rules in effect for each user. This matching function is described in detail hereinbelow with reference to FIG. 7. Matcher 52 preferably uses an XML parser 53, as is known in the art, to extract the required policy information from applicable P3P policy files.

To store and retrieve user information from database 28, manager 51 invokes a user data handler 54 and a user policy handler 56. Data handler 54 adds, deletes, updates and queries user personal information records in a personal data store 55 in database 28. Policy handler 56 maintains privacy policy information, in a user privacy rule store 57, for each user who personal information is stored in data store 55. The data in store 57 list all policies applicable to the specific user, with a time stamp for each policy. The structure of the information in stores 55 and 57 and the procedures used in storing, updating and recalling the information are described in detail hereinbelow with reference to FIGS. 6 and 7.

Figure 4:
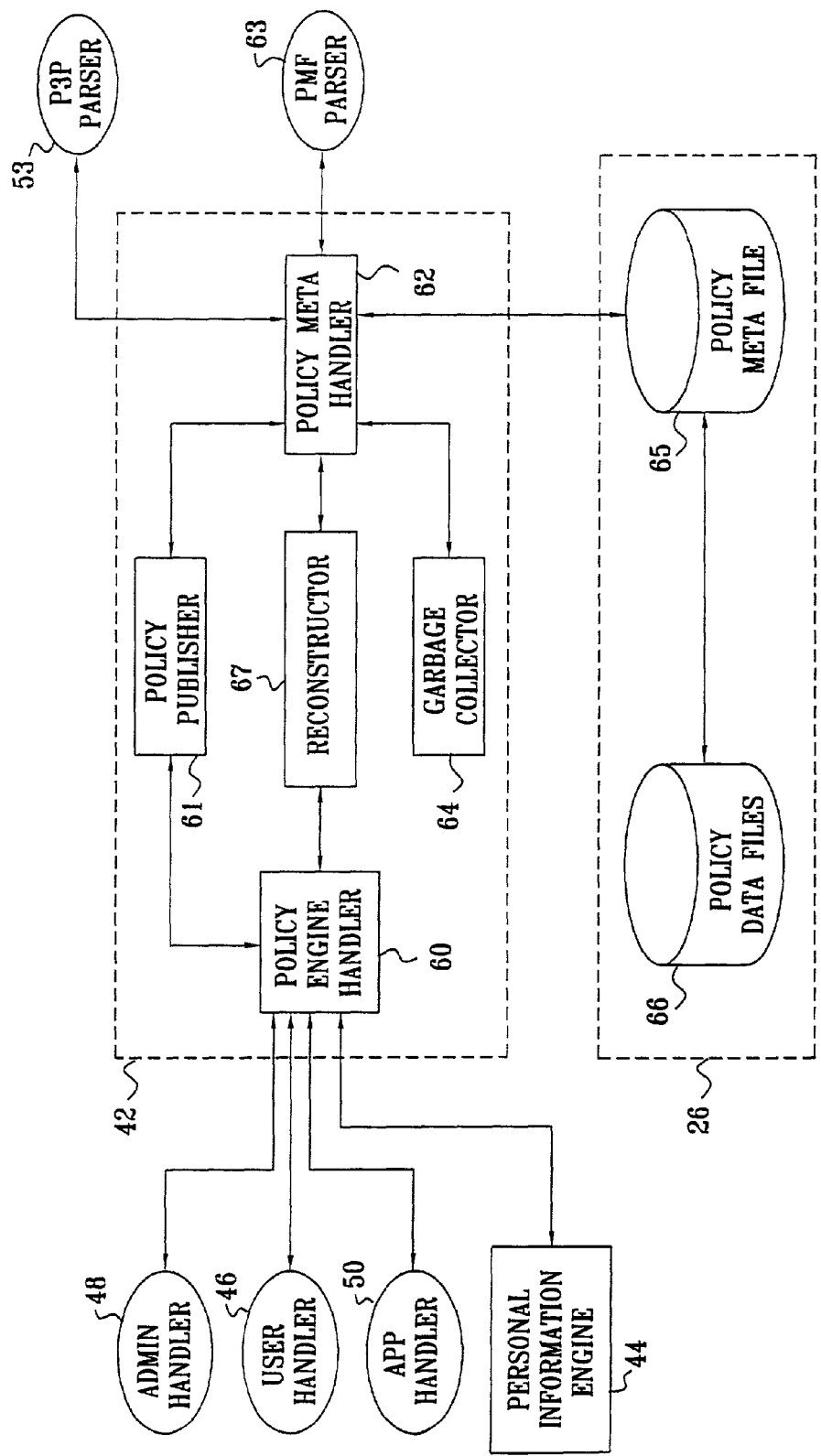
FIG. 4 is a block diagram that schematically shows details of a policy engine used in the privacy manager of FIG. 2, in accordance with a preferred embodiment of the present invention.

FIG. 4 is a block diagram that schematically illustrates the functional structure of policy engine 42, in accordance with a preferred embodiment of the present invention. A policy engine handler 60 is responsible for interaction with other elements of EPM 22. These interactions include receiving new policy inputs and updates from administrator request handler 48 and providing policy information to user handler 46 and application handler 50. In addition, handler 60 supplies policy files to personal information engine 44 for use in matching to application requests.

Access to policy information, which is stored in repository 26, is coordinated by a policy meta handler 62. The meta handler stores the enterprise policies in the form of a hierarchical tree, which is described in detail hereinbelow with reference to FIG. 5. A policy meta file parser 63 is used to parse the tree and to store it in a policy meta file 65 in repository 26. The policy data, or rules, that are actually associated with each node of the tree are stored in a policy data file store 66. Handler 62 preferably uses parser 53, as mentioned above, to parse the P3P policies in store 66. A garbage collector 64 periodically deletes outdates policies in repository 26, i.e., policy rules that have been superseded by newer policies, and which do not apply to any of the user data remaining in database 28.

When administrator 50 submits a new policy or a policy change request (through handler 48), policy engine handler 60 invokes a policy publisher 61. The publisher provides the old policy to handler 48 for editing, using administration tool 32, and then passes the changes to policy meta handler 62 for storage in the policy meta file and in she appropriate policy data files.

On the other hand, when a user or application or the personal information engine requests policy information, policy engine handler 60 invokes a reconstructor 67. The reconstructor asks policy metal handler 62 to supply the appropriate policy sections from repository 26 and uses them to reconstruct the appropriate policy file, preferably in P3P format. Handler 60 then passes the policy file to the requestor. Details of the processes of policy request and reconstruction are described hereinbelow with reference to FIGS. 6 and 7.

Figure 5:
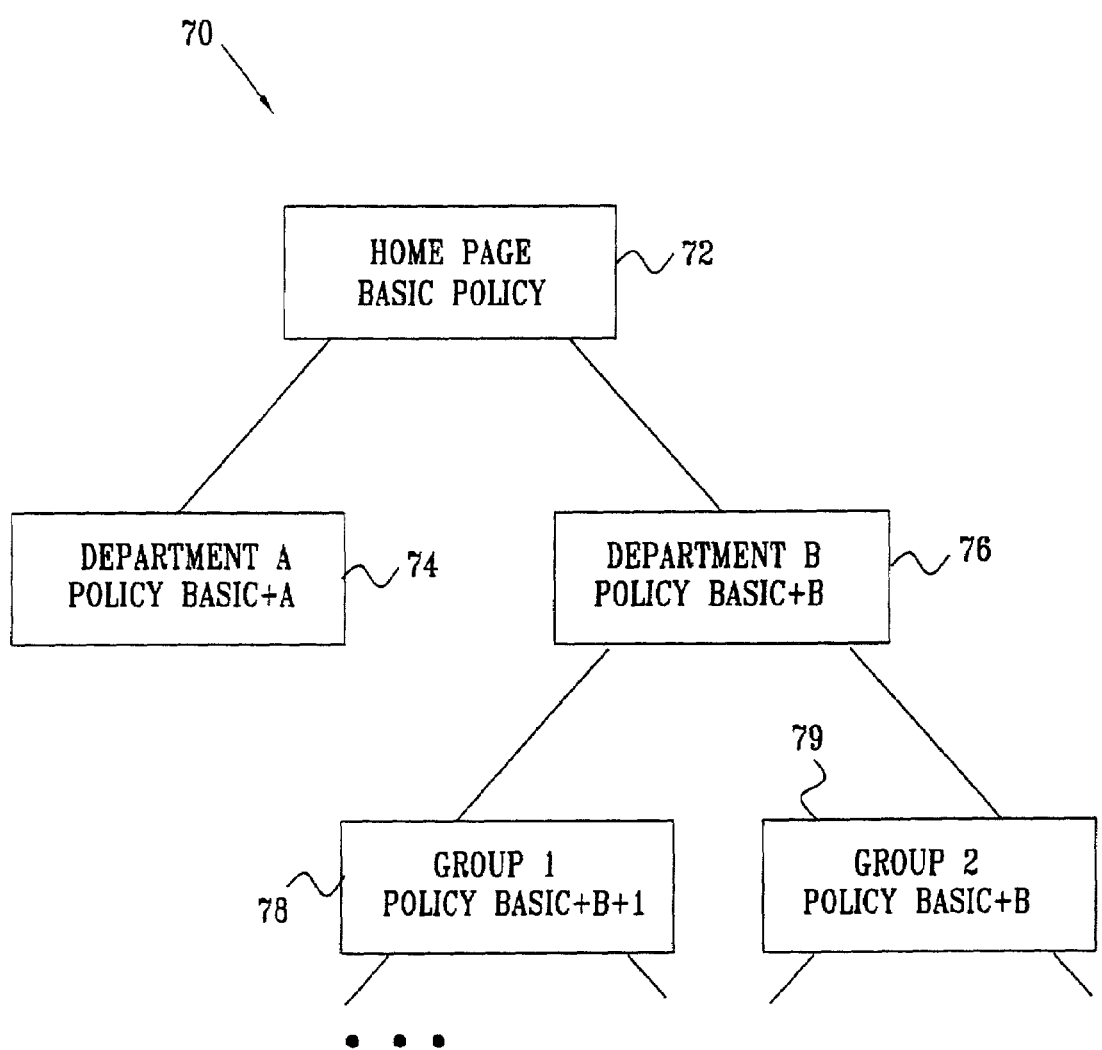
FIG. 5 is a graph that schematically illustrates a hierarchy of information exchange nodes with respective privacy policies, in accordance with a preferred embodiment of the present invention.

FIG. 5 is a graph that schematically illustrates a hierarchy 70 of nodes in an enterprise Web site, showing privacy policies assigned to the nodes, in accordance with a preferred embodiment of the present invention. Typically, the home page of the Web site serves as a root node 72 in the hierarchy. Web pages belonging to different departments in the enterprise, which are linked directly to the home page, are assigned to be second-tier nodes 74 and 76. The Web pages of different activity groups in one of the departments are shown as third-tier nodes 78 and 79. In a typical e-business enterprise, a user might enter the Web site via the home page, link through to "Department B" to browse through goods of a particular classification offered by the enterprise, and then link to "Group 1" or "Group 2" to order goods of one type or another. This structure is described here solely by way of example, however, and substantially any other hierarchical arrangement of the nodes can also be used. Moreover, while it is convenient to have the hierarchy of nodes correspond to the hierarchy of linked Web pages within the site, it is in no way necessary that there be such a correspondence.

Each of the nodes in hierarchy 70 has an associated privacy policy, which is preferably designed using administrative tool 32 and is maintained by policy engine 42 in data files store 66 (FIG. 4). Node 72 has a basic privacy policy, which is set on an enterprise-wide basis and preferably applies to all of the other nodes, as well. Departments A and B may have additional, stricter privacy rules, which apply to nodes 74 and 76, respectively, and to all of their subordinate nodes. Thus, the privacy policy at node 76 is a combination of the basic policy with the "B" rules. Similarly, at the third tier, additional privacy rules are imposed at node 78, in addition to the basic and "B" policy rules. On the other hand, it is not necessary that every node introduce additional privacy rules, so that in the present example, node 79 is covered only by the basic and "B" policy rules of node 76. When administrator 30 changes the privacy policy rules in effect at one of the nodes, the change affects that node and all of its subordinate nodes, but does not affect other branches of the hierarchy.

Preferably, the basic policy and the rules added at each of the nodes are represented as P3P policy sections, written in XML, as illustrated by the following sample code:

```
<POLICY-TREE>
    <NODE name="Home" id="/" parent="ROOT_NODE">
        <SECTION timestamp="01011999110000" count="10"
            source="__1.p3p"/>
    </NODE>
    <NODE name="PC" id="/PC/" parent="/">
        <SECTION timestamp="01012000120000" count="1"
            source="__pc__1.p3p"/>
        <SECTION timestamp="31012000090000" count="1"
            source="__pc__2.p3p"/>
    </NODE>
    <NODE name="PC Shop" id="/PC/shop/" parent="/PC/">
        <SECTION timestamp="01012000130000" count="2"
            source="__pc__shop__1.p3p"/>
    </NODE>
    <NODE name="PC Customer Relations" id="/PC/CR/"
            parent="/PC/">
        <SECTION timestamp="01012000130000" count="1"
            source="__pc__cr__1.p3p"/>
    </NODE>
    ... [further nodes]
</POLICY-TREE>
```

As shown in the example above, the policy tree consists of <NODE> elements, which are identified by the respective "id" attributes and linked by the "parent" attributes. The policy tree is stored in meta file 65. Each <NODE> element comprises one or more <SECTION> elements, which contain one or more P3P source file names, giving the locations of the P3P rules associated with the section in policy data file store 66. Each source file name has a timestamp of the form DDMMYYYYHHMMSS indicating the time at which the policy for the section was created or changed. The "count" argument is a section reference count used for internal maintenance of the hierarchy.

Root node 72 has a P3P preamble (with the tags ENTITY, DISPUTES-GROUP and ACCESS) shared by all of the nodes in hierarchy 70. To determine the policy applicable to any other node, policy engine 42 reads and combines the policy sections applicable to that node and to all of its ancestor nodes up to and including the root node. Preferably, the privacy policy for any given node is simply the superposition (or union) of all of the applicable policy sections. Alternatively, more complex combining operations may be available, including condition statements and overriding of one rule by another.

Figure 6:
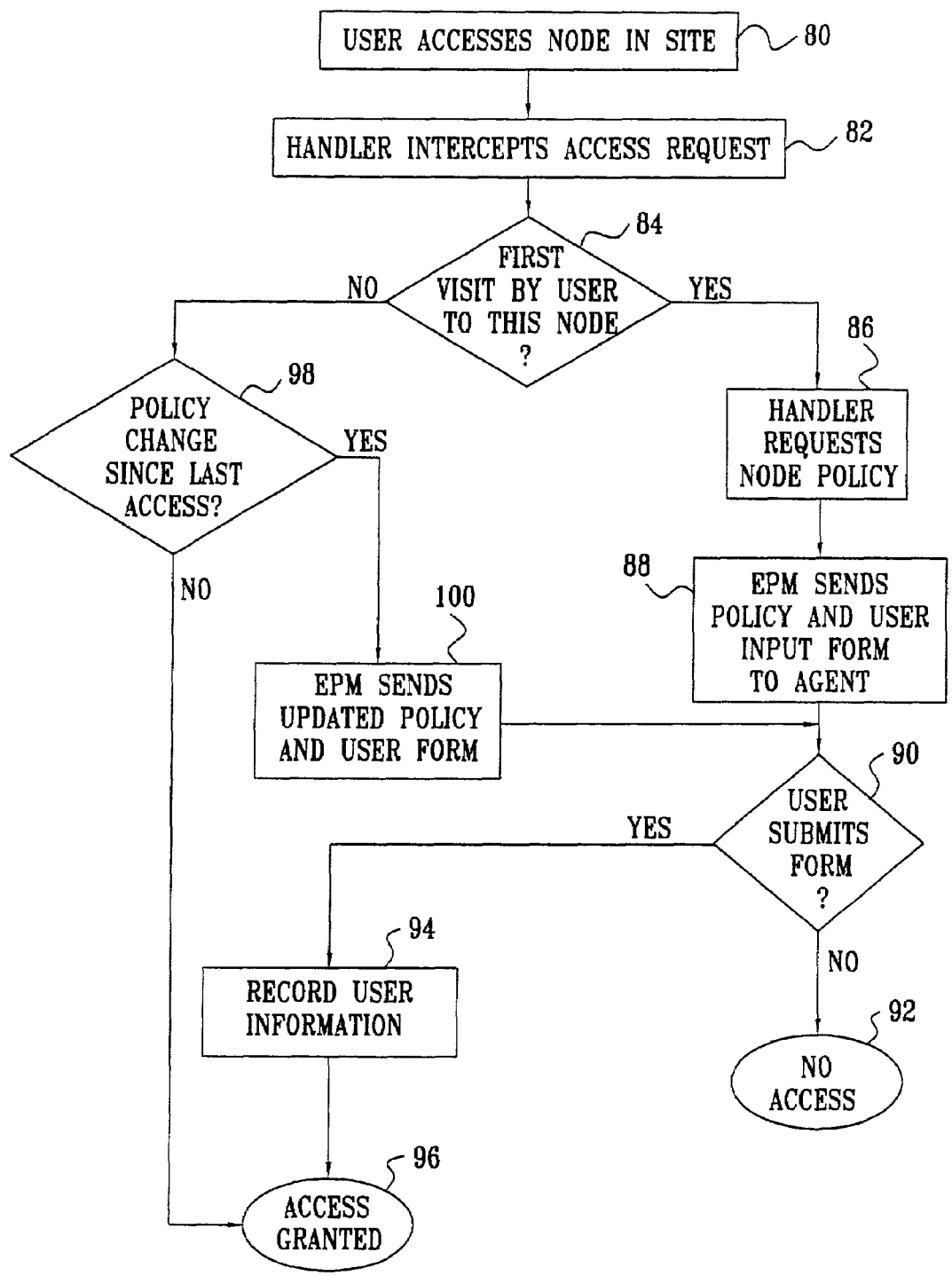
FIG. 6 is a flow chart that schematically illustrates a method for receiving private information from a user subject to a privacy policy, in accordance with a preferred embodiment of the present invention.

FIG. 6 is a flow chart that schematically illustrates a method by which EPM 22 handles an exchange of private information with user 38, in accordance with a preferred embodiment of the present invention. The method is invoked whenever a user asks to access a node in the enterprise Web site, at an access step 80. The access request is intercepted by user handler 46, at an interception step 82. Interception is preferably accomplished by configuring Web server 24 to redirect the original user HTTP request to the handler servlet by aliasing, as is known in the art. Handler 46 attempts to identify the user, using cookies previously written to the user's disk or other methods known in the art. Alternatively, the handler prompts the user to identify himself or herself. The handler then queries personal information engine 44 to determine the last time this user visited the node in question, at a visit query step 84.

If this is the first visit by the user to this node, it is necessary to obtain the user's consent to the node privacy policy before proceeding further. For this purpose, handler 46 generates a request to retrieve the appropriate node policy from policy engine 42, at a policy request step 86. Preferably, in order to request the policy, the handler creates a uniform resource locator (URL) for the appropriate P3P policy reference file that contains the current policy information for the node. The reference file URL specifies the user ID, node URL and a current timestamp as parameters. In the example below, the node is named "PC shop." The timestamp parameter is important in order to assure that the policy is "immutable," i.e., that any change in the policy will result in a new URL.

The URL is preferably sent to the user by means of a "policyref" header provided by P3P, as illustrated by the following sample code:
  P3P: policyref="http://www.ibm.com/servlet/P3Pservlet?mode=PolicyRef&userID=12345&node=PC_shop&time=01012000115959"

P3P agent 40 uses this URL to submit a HTTP request for the policy reference file for the node in question. In response, the policy engine sends the policy reference file to handler 46, which passes the file to the P3P agent, at a policy sending step 88. Typically, the file has the following form:

```
<META xmlns="http: //www.w3.org/2000//10/18/P3Pv1">
<POLICY-REFERENCES>
    <POLICY-REF about="/servlet/P3Pservlet?
            mode=P3PPolicy&userID=12345&
            node=PC__shop&time=01011999115959">
        <INCLUDE>/PC/shop/</INCLUDE>
    </POLICY-REF>
</POLICY-REFERENCES>
</META>
```

Agent 40 parses the policy reference file and asks EPM 22 for the policy pertaining to the element indicated by the INCLUDE tag (in this case, /PC/shop). Reconstructor 67 (FIG. 4) reconstructs the appropriate policy from the hierarchy of policy information stored in repository 26, and handler 46 delivers the policy to the agent. This procedure differs from standard P3P protocols, which are based on static URLs, in that it uses a servlet call to recall a dynamic reference file and then to reconstruct the actual policy. Although the example above refers to a single node policy, it can be modified in a straightforward way to enable the EPM to provide a P3P agent with more than one or even all policies available at the Web site.

P3P agent 40 displays the node policy to user 38, together with a form provided by EPM 22, asking the user to supply the personal information required for this node, at a form submission step 90. If the user has already supplied some or all of the information at other nodes (or on a previous visit, as described below), the appropriate fields in the form are preferably filled in by the EPM in advance. It may even occur that no data are solicited at step 90. In any case, the form appearing at this step also includes a submission button, labeled "Accept Policy and Submit Data," for example.

When the user clicks on this button, after having filled out the form as required, EPM 22 records the user's acceptance of the node policy in rule store 57 (FIG. 3), at a recording step 94. In addition, any new personal data provided by the user are stored in personal data store 55. Each such data item is stored along with accompanying metadata identifying the privacy policy rules that pertain to it, as they have been accepted by the user. Preferably, as noted above, for each user record in data store 55 there is an associated list of nodes whose policies the user has accepted, including the appropriate policy acceptance time stamps. This structure enables the EPM subsequently to reconstruct each of the policies accepted by the user and to check whether the policy has changed since the user's last visit. Most preferably, EPM 22 checks the data submitted by the user for completeness and validity before storing them in the database. Once the exchange of personal information is completed, the user can access the node, at an access grant step 96. The process of policy approval and information submission is preferably repeated whenever the user accesses a new node.

On the other hand, if the user is unwilling to click on the submission button, he or she is typically denied access to the node in question, at an access denial step 92. Alternatively, the privacy policy for the node may include different, optional versions, and EPM 22 may be configured to negotiate with user 38 to find a mutually-agreeable version. Methods for negotiation of privacy policies between a Web site and a user are described, for example, in a U.S. patent application entitled "Business Privacy in the Electronic Marketplace," filed Nov. 30, 2000, which is assigned to the assignee of the present patent application, and which is incorporated herein by reference.

Returning now to step 84, if personal information engine 44 indicates that the user has already visited this node in the past, handler 46 queries policy engine 42, at a change query step 98, to determine whether there has been a change in the node policy since the user's last visit. If there has been no change, it means that the user has already agreed to the current node privacy policy, and the user can proceed directly to access the node at step 96. On the other hand, if engine 42 indicates that there has been a policy change, it is necessary to solicit the user's agreement to the change.

For this purpose, at a policy update step 100, handler 46 constructs another policy reference file URL, similar to the URL listed above, referring to the old node policy to which the user earlier agreed. In this case, the URL contains the same user ID and node URL as the current policy URL listed above, but has the old time stamp, referring to the user's last visit to the node as provided by engine 44. An "oldpolicyref" header, which is a non-standard form of the P3P "policyref" header mentioned above, is used to send the old policy reference file URL to P3P agent 40. The "oldpolicyref" header has the same form as the "policyref" header listed above, except that it includes the old time stamp, rather than the current one. Along with this URL, handler 46 sends the current policy reference file URL to P3P agent 40, as in steps 86 and 88 described above.

The P3P agent uses the old and current policy reference files to request that EPM 22 provide both the old and current policies for the node of interest, in the same manner as the current policy was requested at step 88. The agent preferably displays the new policy alongside the old one on the user's computer in a way that enables the user to see the changes that have been made. If the user accepts the policy change, at step 90, the new user data and metadata are recorded accordingly at step 94, and the user can access the node at step 96. On the other hand, if the user declines the new policy, the user is denied access to the node at step 92. In this case, the personal data submitted previously by this user are preferably maintained in database 28 subject to the old, agreed-upon privacy rules. Alternatively, enterprise business practice may require that any affected data regarding this user (or all data regarding this user) be expunged from the database. Further alternatively, the EPM may negotiate the privacy policy with the user, as mentioned above.

In implementing the methods described herein for soliciting user acceptance of a Web site privacy policy, the node privacy policies may be presented to the user in a variety of alternative ways. In a straightforward embodiment, the user is simply presented with a list of privacy rules that are pertinent to the requested personal information. Alternatively, a system of ratings may be provided, giving a summary grade to the privacy policy of a node based on the collection of rules that make up the node policy. These grades are typically based on compliance with national or local privacy laws, company practices, industry regulations, standards or other factors, individually or in combination. For example, the policies may be graded according to their compliance with the "Five Fair Information Practices" promulgated by the U.S. Federal Trade Commission (1998):

Notice (enterprise must declare its privacy policies)—Any P3P-based policy complies by its very existence.

Choice (users must consent and choose what to submit and for what uses)—A policy that relates only to categories of personal information will receive a lower rating than one that lists policies precisely for each data item.

Access (users must have access to their own personal information that is stored by the enterprise)—A policy that allows the user free access to all records regarding him or her will receive a higher rating than a policy that allows only selective access.

Integrity (personal data must be stored and transferred securely—not covered at present by the P3P standard)—A policy with a "strong" security extension will receive a higher rating than a policy with only informal security or no security provisions.

Enforcement (users must be able to enforce enterprise policy commitments and have recourse when violations occur)—P3P policies will be rated according to whether they include the optional <DISPUTES> element and the content of the element when it is present.

The summary grades provide users with a quick and simple evaluation of the privacy policies of the Web site or page that they are visiting. Preferably, the EPM parses the pertinent policy files for each node and grades the node policy automatically. This same notion of privacy grades can be used by administrative tool 32, for example, to automatically generate a detailed node privacy policy meeting a grade specified by administrator 30.

In another embodiment, different classes of privacy service are defined, so that EPM 22 gives certain preferred users enhanced privacy treatment. For example, established customers of a bank may be exempt from providing certain information that other customers are required to submit. These class treatment features are preferably stored in policy repository 26 as a part of the privacy rules pertaining to each node in the Web site. Each user record in database 28 should also have a "class of privacy" field to allow convenient linking to the appropriate privacy policies.

Figure 7:
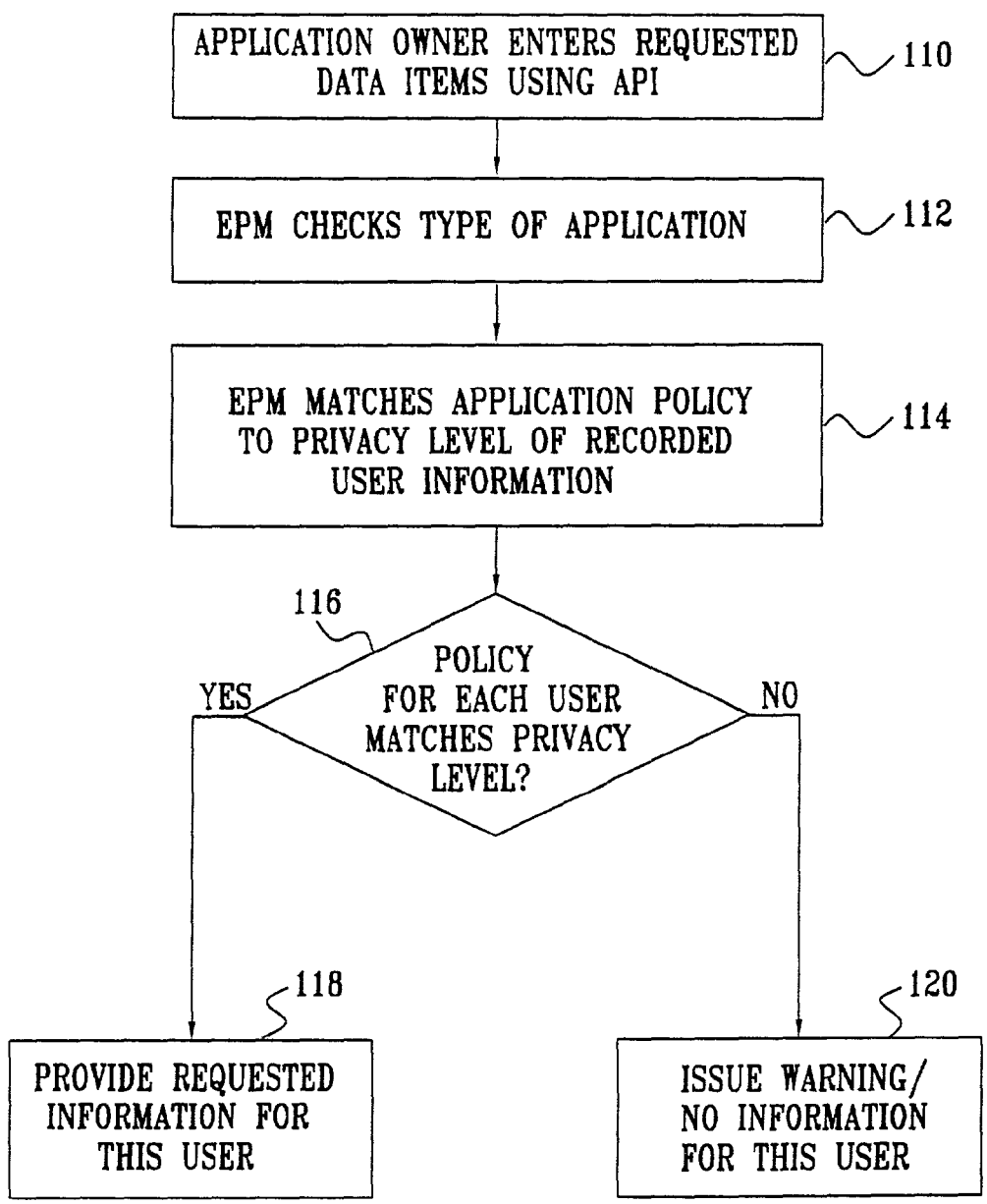
FIG. 7 is a flow chart that schematically illustrates a method for providing private information to an application, in accordance with a preferred embodiment of the present invention.

FIG. 7 is a flow chart that schematically illustrates a method by which application 36 accesses personal information in database 28, in accordance with a preferred embodiment of the present invention. Application owner 34 specifies a list of requested user data, at a data request step 110, using the appropriate API that is provided for EPM 22, as described above. Before returning the information requested by application 36, application handler 50 checks the type of the application, at a type checking step 112. Preferably, each application is identified as a particular type of P3P data recipient:

"Ourselves" for internal applications.

"Same" for business partners following a similar privacy policy to that applied by EPM 22.

"Other" for business partners following a different policy.

"Delivery" for delivery organizations (such as postal and parcel services) following an unknown policy.

"Unrelated" for unrelated parties or parties following an unknown policy.

"Public" for public for a such as bulletin boards, commercial CD-ROMS, etc.

"Internal" applications, generated within the enterprise to which the EPM belongs, have a known policy in accordance with the enterprise privacy policies in repository 26, governing the uses to which such internal applications may put the private user information they receive. Other, "external" applications, on the other hand, are required at step 112 to furnish their complete P3P privacy policies to handler 50. EPM 22 maintains a index of all applications that are eligible to query database 28, listing the applications by recipient type. For at least internal applications, the index is preferably subdivided according to the purposes for which the application uses the information that it may receive. Preferably, each application is identified by an application ID, which can be used to streamline the type checking step.

Application handler 50 receives the privacy policy of the application and the list of data requested by the application, at a policy matching step 114. For internal applications, the policy is preferably constructed from the data use purposes of the application that are stored in repository 26. The privacy policy and the list of requested data are passed to matcher 52 in personal information engine 44, which compares the privacy policy to the specific privacy rules governing each item of requested data from database 28 that appears on the list, at a privacy evaluation step 116. As noted above, these privacy rules are determined and stored by EPM 22 based on the combination of privacy policies to which the user agreed while visiting the enterprise Web site. In response to the application request, engine 44 finds all of the policies that the user has ever accepted in order to reconstruct the rules that are currently applicable to the requested data. The rules are preferably reconstructed in a P3P format for comparison to the privacy policy of the application.

Engine 44 returns an output table to application 36 (via handler 50) containing the data that the application has requested, to the extent permitted by the privacy policies of EPM 22. Preferably, the table is provided in the form of a XML file, which is conveyed to the application as a HTML response. The engine preferably checks the privacy criteria individually for each user and for each field of the information concerning that user, in accordance with the data stored in database 28. So long as the temporary privacy policy matches the pertinent rules for the user and the specific field, engine 44 enters the requested information in the output table, at an information provision step 118. On the other hand, when there is a mismatch between the temporary privacy policy and the rules for a given field, engine 44 makes a null entry in the table for that particular field, at an information refusal step 120. If no disclosure to the application is permitted at all with regard to a given user, the row of the output table relating that user is preferably deleted completely. Preferably, when EPM 22 has refused to provide information in one or more fields of the output table, it issues a warning to application 36 that information has been omitted due to privacy policy constraints.

Preferably, EPM 22 maintains a log regarding all personal information that is submitted by users and all subsequent use of the information. The log includes:

Policies in effect and agreed to by users at the time that they submitted personal information to the EPM.

Times at which users submitted personal information.

Disclosures of data to internal and third-party applications, including policies observed by the applications.

Cases of access by users to their own personal information for viewing, verification and update.

The log can be audited using standard or custom audit tools in order to allow both the enterprise itself and outside parties to verify adherence of the enterprise to its declared privacy policies.

Although preferred embodiments are described hereinabove with reference to Web sites and user interactions with such sites, it will be understood that the principles of the present invention are applicable generally to structured exchanges of private information resources between users and an enterprise, and are not limited to any specific framework of computer network communication. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for privacy management, comprising:

providing a linked collection of Web pages, comprising at least first and second Web pages, on a Web site maintained by an enterprise, so as to enable a user to exchange information with the enterprise via the Web pages;

assigning, by the enterprise, respective, non-uniform privacy policies to at least some of the Web pages regarding use of the information that is exchanged through the Web pages, the privacy policies comprising at least a first privacy policy assigned to the first Web page and a second, different privacy policy assigned to the second Web page;

providing to the user accessing the first and second Web pages the respective privacy policies for the first and second Web page; and exchanging the information with the user via the Web site subject to the non-uniform privacy policies, such that at least a first portion of the information is exchanged via the first Web page subject to the first privacy policy, and at least a second portion of the information is exchanged via the second Web page subject to the second privacy policy.

2. A method according to claim 1, wherein exchanging the information with the user comprises receiving private information submitted to the enterprise by the user.

3. A method according to claim 2, wherein receiving the private information comprises receiving the user's agreement to at least one of the privacy policies, and recording the private information together with an indication of the at least one of the privacy policies agreed upon.

4. A method according to claim 3, and comprising: intercepting a request from an application to use the private information received from the user;

querying the application to determine its compliance with the at least one of the privacy policies subject to which the requested information was received; and providing the requested information subject to the compliance of the application with the at least one of the privacy policies.

5. A method according to claim 1, wherein providing the linked collection of Web pages comprises arranging the Web pages in a hierarchy of nodes that comprises a root node, such that each of the nodes except for the root node has a parent node in the hierarchy, and wherein assigning the privacy policies comprises assigning to each of at least some of the nodes, including the nodes associated with the first and second Web pages, one or more respective privacy rules regarding use of the information that is associated with the nodes, and setting for each of the nodes a node privacy policy that comprises the privacy rules assigned to the node combined, for each of the nodes except the root node, with the node privacy policy of its parent node.

6. A method according to claim 1, wherein providing the respective privacy policies comprises informing the user who has exchanged the information associated with the first Web page subject to the first privacy policy of a difference in the second privacy policy relative to the first privacy policy before exchanging the information associated with the second Web page.

7. A method according to claim 1, wherein assigning the non-uniform privacy policies comprises assigning an initial privacy policy to the first Web page, and subsequently making a change in the initial privacy policy so as to assign a modified privacy policy to the first Web page, and wherein providing the privacy policies to the user comprises informing the user who has exchanged information with the first Web page subject to the initial privacy policy of the change.

8. A method according to claim 7, wherein informing the user comprises prompting the user to provide an input to indicate whether the user accepts or rejects the change.

9. A method according to claim 1, wherein assigning the privacy policies comprises storing the privacy policies in a computer server belonging to the enterprise, and wherein providing the privacy policies to the user comprises intercepting a request by the user to access the first Web page and providing the first privacy policy to the user responsive to the request.

10. A method according to claim 1, wherein providing the privacy policies comprises conveying the policies in a standard form for presentation by a Web browser.

11. A method according to claim 10, wherein the standard form comprises a form specified by the Platform for Privacy Preferences Project (P3P).

12. A method according to claim 1, wherein assigning the non-uniform privacy policies comprises determining a rating for each of the policies based on a predetermined rating scale.

13. A method according to claim 1, wherein assigning the non-uniform privacy policies comprises defining first and second user classes and defining, for a given one of the Web pages, different first and second class privacy policies, respectively, for the first and second user classes, and wherein providing the privacy policies to the user comprises determining whether the user belongs to the first or second class and providing the first or the second class privacy policy accordingly.

14. A computer-implemented method for privacy management, comprising:

arranging a body of information in a hierarchy of nodes that comprises a root node, such that each of the nodes except for the root node has one or more ancestor nodes in the hierarchy;

assigning to each of at least some of the nodes one or more respective privacy rules regarding use of the information that is associated with the node;

wherein arranging the body of information comprises associating the nodes with respective Web pages accessible through a Web site;

receiving a request from a user to access a given node;

computing a node privacy policy for the given node by combining the privacy rules assigned to the given node with node privacy policies of the ancestor nodes of the given node in the hierarchy;

providing the computed node privacy policy to the user; and exchanging with the user at least a portion of the information that is associated with the given node subject to the provided privacy policy.

15. A method according to claim 14, wherein exchanging the information with the user comprises receiving private information submitted by the user.

16. A method according to claim 14, wherein assigning the respective privacy rules comprises representing the privacy rules assigned to each of the at least some of the nodes as respective policy sections, which are written in an extended extensible markup language (XML) and comprise an attribute identifying a parent node in the hierarchy.

17. A computer-implemented method for privacy management, comprising:

providing a linked collection of interactive resources through which a user is able to exchange information with an enterprise that provides the resources, at least some of the resources having privacy policies associated therewith regarding use of the information that is exchanged through the resources;

wherein the collection of interactive resources comprises a collection of Web pages accessible through a Web site of the enterprise;

receiving information from users who access the resources subject to the privacy policies;

intercepting a request from an application to use the information received from the users;

upon receiving the request from the application, querying the application to determine compliance of the application with the privacy policies subject to which the requested information was received; and providing the requested information to the application subject to the compliance of the application with the privacy policies.

18. A method according to claim 17, wherein providing the linked collection of resources comprises associating non-uniform privacy policies with the resources, and wherein receiving the information comprises receiving and storing different items of the information subject to different privacy rules from among the non-uniform privacy policies.

19. A method according to claim 18, wherein providing the requested information comprises checking the compliance of the application with the privacy rules respectively applicable to each of the items of the information requested by the application.

20. A method according to claim 18, wherein providing the requested information comprises determining that the application does not comply with the rules respectively applicable to a given item of the information, and refusing to provide the requested information with respect to the given item, while providing other information with respect to which the application does comply with the respectively applicable rules.

21. A method according to claim 17, wherein receiving the information comprises receiving the information from first and second users subject to respective first and second privacy policies, and wherein providing the requested information comprises checking the compliance of the application with both the first and the second privacy policies.

22. A method according to claim 17, and comprising making a record of the request and of the information provided responsive thereto in a log for review in a subsequent privacy audit.

23. Apparatus for privacy management, comprising a computer enterprise server arranged to provide a linked collection of Web pages, comprising at least first and second Web pages, on a Web site maintained by an enterprise, so as to enable a user to exchange information with the enterprise via the Web pages, and to permit the enterprise to assign respective, non-uniform privacy policies to at least some of the Web pages regarding use of the information that is exchanged through the Web pages, the privacy policies comprising at least a first privacy policy assigned to the first Web page and a second, different privacy policy assigned to the second Web page, and further arranged to provide to the user accessing the first and second Web pages the respective privacy policies for the first and second Web page, and to exchange the information with the user via the Web site subject to the non-uniform privacy policies, such that at least a first portion of the information is exchanged via the first Web page subject to the first privacy policy, and at least a second portion of the information is exchanged via the second Web page subject to the second privacy policy.

24. Apparatus according to claim 23, wherein the information exchanged with the user comprises private information submitted to the enterprise by the user.

25. Apparatus according to claim 24, wherein the server is arranged to receive the user's agreement to at least one of the privacy policies, and to record the private information together with an indication of the at least one of the privacy policies agreed upon.

26. Apparatus according to claim 25, wherein the server is further arranged to intercept a request from an application to use the private information received from the user, to query the application to determine its compliance with the at least one of the privacy policies subject to which the requested information was received, and to provide the requested information subject to the compliance of the application with the at least one of the privacy policies.

27. Apparatus according to claim 23, wherein the Web pages are arranged in a hierarchy of nodes that comprises a root node, such that each of the nodes except for the root node has a parent node in the hierarchy, and wherein the server is arranged to associate with each of at least some of the nodes, including the nodes associated with the first and second Web pages, one or more respective privacy rules regarding use of the information that is associated with the nodes, and to set for each of the nodes a node privacy policy that comprises the privacy rules assigned to the node combined, for each of the nodes except the root node, with the node privacy policy of its parent node.

28. Apparatus according to claim 23, wherein the server is arranged to inform the user who has exchanged the information associated with the first page to the first privacy policy of a difference in the second privacy policy relative to the first privacy policy before exchanging the information associated with the second Web page.

29. Apparatus according to claim 23, wherein the server is arranged to assign an initial privacy policy to the first Web page, and subsequently to receive an indication of a change in the initial privacy policy so as to assign a modified privacy policy to the first Web page, and to inform a user who has exchanged information with the first Web page subject to the initial privacy policy of the change.

30. Apparatus according to claim 29, wherein the server is arranged to generate a prompt to the user to provide an input to indicate whether the user accepts or rejects the change.

31. Apparatus according to claim 23, wherein the server is adapted to convey the policy to a client computer in a standard form for presentation by a Web browser.

32. Apparatus according to claim 31, wherein the standard form comprises a form specified by the Platform for Privacy Preferences Project (P3P).

33. Apparatus according to claim 23, wherein the server is arranged to determine a rating for each of the policies based on a predetermined rating scale.

34. Apparatus according to claim 23, wherein the server is arranged to receive a definition of first and second user classes and, for a given one of the resources, different first and second class privacy policies, respectively, for the first and second user classes, and to determine whether the user belongs to the first or second class and to provide the first or the second class privacy policy to the user accordingly.

35. Apparatus for privacy management, comprising a computer server arranged to receive and store a body of information in a hierarchy of nodes that comprises a root node, such that each of the nodes except for the root node has one or more ancestor nodes in the hierarchy, together with an assignment to each of at least some of the nodes of one or more respective privacy rules regarding use of the information that is associated with the node;

wherein the body of information comprises a collection of Web pages accessible through a Web site, and wherein the server is arranged to associate the nodes with respective ones of the Web pages;

wherein the server is arranged, in response a request from a user to access a given node, to compute a node privacy policy for the given node by combining the privacy rules assigned to the given node with node privacy policies of the ancestor nodes of the given node in the hierarchy, to provide the computed node privacy policy to the user, and to exchange with the user at least a portion of the information that is associated with the given node subject to the provided privacy policy.

36. Apparatus according to claim 35, wherein the information exchanged with the user comprises private information submitted to the server by the user.

37. Apparatus according to claim 35, wherein the server is arranged to represent the privacy rules assigned to each of the at least some of the nodes as respective policy sections, which are written in an extended extensible markup language (XML) and comprise an attribute identifying a parent node in the hierarchy.

38. Apparatus for privacy management, comprising a computer enterprise server arranged to provide a linked collection of interactive resources through which a user is able to exchange information with an enterprise that provides the resources, at least some of the resources having privacy policies associated therewith regarding use of the information that is exchanged through the resources, and to receive information from users who access the resources subject to the privacy policies, wherein the collection of interactive resources comprises a collection of Web pages accessible through a Web site of the enterprise, wherein the server is arranged to intercept a request from an application to use the information received from the users, and upon receiving the request, to query the application to determine compliance of the application with the privacy policies subject to which the requested information was received, and to provide the requested information to the application subject to the compliance of the application with the privacy policies.

39. Apparatus according to claim 38, wherein the server is arranged to associate non-uniform privacy policies with the resources, and to receive and store different items of the information subject to different privacy rules from among the non-uniform privacy policies.

40. Apparatus according to claim 39, wherein the server is arranged to check the compliance of the application with the privacy rules respectively applicable to each of the items of the information requested by the application.

41. Apparatus according to claim 39, wherein when the server is arranged, upon determining that the application does not comply with the rules respectively applicable to a given item, to refuse to provide the requested information with respect to the given item, while providing other information with respect to which the application does comply with the respectively applicable rules.

42. Apparatus according to claim 38, wherein the server is arranged to receive the information from first and second ones of the users subject to respective first and second privacy policies, and to check the compliance of the application with both the first and the second privacy policies.

43. Apparatus according to claim 38, wherein the server is adapted to make a record of the request and of the information provided responsive thereto in a log for review in a subsequent privacy audit.

44. A computer software product for privacy management, comprising a computer-readable medium in which program instructions are stored, which instructions, when read by a computer, cause the computer to provide a linked collection of Web pages, comprising at least first and second Web pages, on a Web site maintained by an enterprise, so as to enable a user to exchange information with the enterprise via the Web pages, and to permit the enterprise to assign respective, non-uniform privacy policies to at least some of the Web pages regarding use of the information that is exchanged through the Web pages, the privacy policies comprising at least a first privacy policy assigned to the first Web page and a second, different privacy policy assigned to the second Web page, wherein the instructions further cause the computer to provide to the user accessing the first and second Web pages the respective privacy policies for the first and second Web page, and to exchange the information with the user via the Web site subject to the non-uniform privacy policies, such that at least a first portion of the information is exchanged via the first Web page subject to the first privacy policy, and at least a second portion of the information is exchanged via the second Web page subject to the second privacy policy.

45. A product according to claim 44, wherein the information exchanged with the user comprises private information submitted to the enterprise by the user, and wherein the instructions cause the computer to receive and store the private information together with an indication of the privacy policy agreed upon.

46. A computer software product for privacy management, comprising a computer-readable medium in which program instructions are stored, which instructions, when read by a computer, cause the computer to arrange a body of information in a hierarchy of nodes that comprises a root node, such that each of the nodes except for the root node has one or more ancestor nodes in the hierarchy, to assign to each of at least some of the nodes one or more respective privacy rules regarding use of the information that is associated with the node, wherein arranging the body of information comprises associating the nodes with respective Web pages accessible through a Web site, wherein the instructions cause the computer, in response a request from a user to access a given node, to compute a node privacy policy for the given node by combining the privacy rules assigned to the given node with node privacy policies of the ancestor nodes of the given node in the hierarchy, to provide the computed node privacy policy to the user, and to exchange with the user at least a portion of the information that is associated with the given node subject to the provided privacy policy.

47. A computer software product for privacy management, comprising a computer-readable medium in which program instructions are stored, which instructions, when read by a computer, cause the computer to provide a linked collection of interactive resources through which a user is able to exchange information with an enterprise that provides the resources, at least some of the resources having privacy policies associated therewith regarding use of the information that is exchanged through the resources, and to receive information from users who access the resources subject to the privacy policies, wherein the collection of interactive resources comprises a collection of Web panes accessible through a Web site of the enterprise wherein the instructions cause the computer to intercept a request from an application to use the information received from the users, to query the application to determine its compliance with the privacy policies subject to which the requested information was received, and to provide the requested information subject to the compliance of the application with the privacy policies.

* * * * *

UNITED STATES PATENT AND TRADEMARK OFFICE
CERTIFICATE OF CORRECTION

PATENT NO.       : 7,225,460 B2
APPLICATION NO.  : 09/728661
DATED            : May 29, 2007
INVENTOR(S)      : Zeev Barzilai et al.

It is certified that error appears in the above-identified patent and that said Letters Patent is hereby corrected as shown below:

In the Assignee:

Please delete "International Business Machine Corporation, Armonk, NY (US)" and insert -- International Business Machines Corporation, Armonk, NY (US)" --

Signed and Sealed this

Tenth Day of July, 2007

JON W. DUDAS
*Director of the United States Patent and Trademark Office*